United States Patent Office 3,480,607
Patented Nov. 25, 1969

3,480,607
POLYMERIZATION
Henry L. Hsieh, Bartlesville, Okla., assignor to Phillips Petroleum Company, a corporation of Delaware
No Drawing. Filed Dec. 3, 1965, Ser. No. 511,326
Int. Cl. C08d 1/14; B01j 11/00; C08f 1/32
U.S. Cl. 260—94.3                                    9 Claims

ABSTRACT OF THE DISCLOSURE

A polymerization method for conjugated dienes and a contacting catalyst comprised on mixing at least one organoaluminum compound, at least one cobalt or vanadium salt of a beta-diketone and a substantial amount of water carried out in a preferred presence of a hydrocarbon diluent and producing a tough and tacky polymer possessing adhesive qualities.

---

This invention relates to a polymerization method and a catalyst therefor.

Heretofore in the polymerization of conjugated dienes in the presence of organometallic catalysts, water has been considered to be a catalyst inactivating agent in many instances and in some cases polymerization problems have been found to stem from the presence of water in the polymerization system while in other cases water has been used as a shortstopping agent to terminate a polymerization reaction. In other instances water has been employed as a catalyst component but generally only in trace amounts.

Quite surprisingly, it has now been found that in the polymerization of conjugated dienes water is a necessary component in the catalyst formed on mixing at least one triorganoaluminum compound or organoaluminum hydride, at least one cobalt or vanadium salt of a beta-diketone, and water. It has been found that with this catalyst system substantially no polymerization occurs in the substantial absence of water. It has further been found that this invention produces polymers containing substantial amounts of, at least 30 weight percent, 1,2- and/or 3,4-addition, i.e., vinyl structure.

Accordingly, it is an object of this invention to provide a new and improved polymerization process.

Other aspects, objects, and the several advantages of this invention will be apparent to those skilled in the art from the description and the appended claims.

According to this invention, conjugated dienes containing from 4 to 12 carbon atoms per molecule, inclusive, such as 1,3-octadiene or 1,3-dodecadiene, preferably butadiene, isoprene, and piperylene, are polymerized alone to form homopolymers or together with one or more other conjugated dienes to form copolymers by use of the catalyst systems of this invention.

The organoaluminum component of this invention is represented by the formula $R_nAlH_m$, where R is selected from the group consisting of alkyl, cycloalkyl, and aryl radicals, and combinations thereof such as alkaryl, aralkyl, and the like, containing from 1 to 20 carbon atoms, inclusive; $n$ is an integer from 1 to 3, $m$ is an integer from 0 to 2 (thus the component can be a triorganoaluminum compound or an organoaluminum hydride); and the sum of $n+m$ equals three. Suitable compounds include trimethylaluminum,
triethylaluminum,
triisobutylaluminum,
tri-n-hexylaluminum,
tri(3,5,7-triethylnonyl)aluminum,
tri-n-eicosylaluminum,
tricyclopentylaluminum,
tricyclohexylaluminum,
triphenylaluminum,
methyldiphenylaluminum,
ethyl-bis(3,5-di-n-heptylphenyl)aluminum,
tribenzylaluminum,
tri-1-naphthylaluminum,
cyclohexyldiisopropylaluminum,
tri-4-tolylaluminum,
n-butyldihydroaluminum,
dimethylhydroaluminum,
ethylmethylhydroaluminum,
diphenylhydroaluminum,
benzyl-n-dodecylhydroaluminum,
dicyclohexylhydroaluminum,
methyl(cyclopentyl)hydroaluminum,
2,6-di-n-butyl-4-hexylphenyldihydroaluminum,
n-amyl(benzyl)hydroaluminum, and the like.

The salt component of the catalyst is represented by the formula

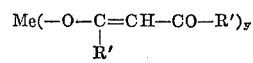
$$Me(-O-\underset{R'}{C}=CH-CO-R')_y$$

wherein Me is cobalt or vanadium, each R' is selected from the group consisting of alkyl, cycloalkyl, and aryl radicals and combinations thereof such as alkaryl, aralkyl, and the like, containing from 1 to 10 carbon atoms, inclusive; and $y$ is an integer equal to the valence of the metal Me. Suitable beta-diketones which can be combined with cobalt or vanadium to form the corresponding salt include 2,4-pentanedione (acetylacetone);
3,5-heptanedione;
11,13-tricosanedione;
1,3-dicyclohexyl-1,3-propanedione;
1,5-dicyclopentyl-2,4-pentanedione;
1,3-diphenyl-1,3-propanedione;
1,5-diphenyl-2,4-pentanedione;
2,8-dimethyl-4,6-nonanedione;
1,3-di(4-n-butylphenyl)-1,3-propanedione;
1,11-diphenyl-5,7-hendecanedione;
1-phenyl-1,3-butanedione;
2,4-decanedione; and
1-(3,5-dimethylcyclohexyl)-2,4-pentanedione, and the like.

The mol ratio of the organoaluminum compound(s) to the cobalt salt and/or vanadium salt of one or more beta-diketones is in the range of from about 2:1 to about 100:1, preferably from about 5:1 to about 50:1.

The quantity of water employed is related to both the organoaluminum compound and the monomer, the mol ratio of organoaluminum compound to water being in the range of from about 0.5:1 to about 2:1, preferably from about 0.75:1 to about 1.5:1, and the relationship of water to monomer being at least 5, preferably from about 5 to about 50, gram millimoles per 100 grams of monomer.

The polymerization temperature, time, and pressure can vary widely depending upon many variables. Generally, the temperature will range from about −40 to about 250° F., preferably from about 20 to about 200° F., while the polymerization time will depend partially upon the temperature, will range from about 5 minutes to about 100 hours or more. The polymerization pressure should be that which is sufficient to maintain the reactants in a substantially liquid state and can be ambient or autogenous.

The polymerization can be carried out in the presence or absence of a diluent but is preferably carried out in the presence of a diluent, preferably a hydrocarbon diluent. Suitable hydrocarbon diluents include paraffins, cycloparaffins, and aromatic hydrocarbons containing from 4 to 10 carbon atoms per molecule, inclusive. Suitable diluents include butane, pentane, hexane, decane, cyclopentane, cyclohexane, methylcyclohexane, benzene, toluene, xylene, ethylbenzene, and the like and mixtures thereof.

The polymers can be separated from the polymerization reaction mass by any conventional methods such as fractionation, steam stripping, coagulation, and the like. The separated polymers can then be washed and dried. Suitable additives such as reinforcing agents, antioxidants, vulcanizing agents, vulcanization accelerators, and the like can be incorporated into the polymer as desired.

The polymers of this invention have excellent green strength and building tack. The polymers are rubbery and suitable for use as carcass stock, particularly in heavy duty and radial ply tires. The polymers are also suitable for tread stock and other well known applications for synthetic rubber. The polymers are tough and tacky and are particularly useful as raw materials for adhesives at least partially, it is believed, although not known to a certainty, because of the cis, trans, and vinyl structure distribution in the polymer. The vulcanizates of the polymers exhibited better retention of tensile and elongation during accelerated aging as compared to commercial rubbers such as commercial cis-polyisoprene.

EXAMPLE I

Isoprene was polymerized in a series of runs in the presence of a catalyst composed of triisobutylaluminum, a cobalt salt of 2,4-pentanedione (acetylacetone), and water. Both cobaltous ($Co^{++}$) and cobaltic ($Co^{+++}$) salts of 2,4-pentanedione were employed. The following recipe was used:

| | |
|---|---|
| Isoprene, parts by weight | 100 |
| Toluene, parts by weight | 860 |
| Triisobutylaluminum (TBA), mhm. | 30 |
| Cobaltous acetylacetonate [$Co(AA)_2$], mhm. | Variable |
| Cobaltic acetylacetonate [$Co(AA)_3$], mhm. | Variable |
| Water, mhm. | Variable |
| Temperature, °F. | 158 |
| Time, hours | 16 |

Mhm.=gram millimoles per 100 grams monomer.

Toluene was charged to the reactor first after which it was purged with nitrogen. Isoprene was added followed by the triisobutylaluminum and then the cobalt acetylacetonate. When water was used it was introduced last. At the termination of each reaction, approximately one part by weight per 100 parts of monomer charged of 2,2'-methylene-bis(4-methyl-6-tert-butylphenol) in solution in isopropyl alcohol was added. The polymer was then coagulated by pouring the mixture into isopropyl alcohol. The product was separated and dried under vacuum. Results are presented in Table I.

TABLE I

| Run No. | Acetylacetonate Type | Mhm. | $H_2O$, Mhm. | TBA:$H_2O$ mole ratio | Conversion isoprene, percent | Inherent [1] viscosity | Gel,[2] wt. percent | Microstructure, wt. percent [3] 3,4-addn. | cis |
|---|---|---|---|---|---|---|---|---|---|
| 1 | $Co(AA)_2$ | 2 | 0 | | 0 | | | | |
| 2 | $Co(AA)_2$ | 2 | 20 | 1.5:1 | 43 | 1.79 | 0 | 53.1 | 32 |
| 3 | $Co(AA)_2$ | 2 | 30 | 1:1 | 100 | 2.00 | 0 | 48.0 | 31 |
| 4 | $Co(AA)_3$ | 1 | 0 | | 0 | | | | |
| 5 | $Co(AA)_3$ | 1 | 10 | 3:1 | 0 | | | | |
| 6 | $Co(AA)_3$ | 1 | 30 | 1:1 | 90 | 2.05 | 0 | 47.6 | 32 |

[1] U.S. Patent 3,078,254, Col. 10, lines 13–22.
[2] U.S. Patent 3,078,254, Col. 10, lines 23–43.
[3] The samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis polyisoprene, trans is not detectable, since trans is measured at the 8.75 micron band.

EXAMPLE II

A series of runs was conducted polymerizing 1,3-butadiene in the presence of a catalyst composed of triisobutylaluminum, a cobalt salt of 2,4-pentanedione, and water. Both cobaltous and cobaltic salts of 2,4-pentanedione were employed. The polymerization recipe and technique were both the same as that described in Example I except that the polymerization time was 1 hour instead of 16. Results are presented in Table II.

TABLE II

| Run No. | Acetylacetonate Type | Mhm. | $H_2O$ mhm. | TBA:$H_2O$ Mole Ratio | Conversion, percent | Inh.[1] Visc. | Gel,[2] percent | Microstructure, wt. percent [3] Cis | Trans | Vinyl |
|---|---|---|---|---|---|---|---|---|---|---|
| 1 | $Co(AA)_2$ | 1 | 0 | | 0 | | | | | |
| 2 | $Co(AA)_2$ | 1 | 10 | 3:1 | 0 | | | | | |
| 3 | $Co(AA)_2$ | 1 | 30 | 1:1 | 80 | 2.68 | 7 | 32.9 | 21.6 | 45.5 |
| 4 | $Co(AA)_3$ | 1 | 0 | | 0 | | | | | |
| 5 | $Co(AA)_3$ | 1 | 10 | 3:1 | 0 | | | | | |
| 6 | $Co(AA)_3$ | 1 | 30 | 1:1 | 63 | 2.36 | 0 | 33.7 | 19.8 | 46.5 |

[1] See Footnote 1, Table I.
[2] See Footnote 2, Table I.
[3] The polymer samples were dissolved in carbon disulfide so as to form a solution having 25 grams polymer per liter of solution. The infrared spectrum of each of the solutions (percent transmission) was then determined in a commercial infrared spectrometer.
The percent of the total unsaturation present as trans 1,4- was calculated according to the following equation and consistent units:
$$\epsilon = \frac{E}{tc}$$
where $\epsilon$=extinction coefficient (liters-mols$^{-1}$-centimeters$^{-1}$); E=extinction (log $I_o/I$); t=path length (centimeters); and c=concentration (mols double bond/liter). The extinction was determined at the 10.35 micron band and the extinction coefficient was 146 (liters-mols$^{-1}$-centimeters$^{-1}$).
The percent of the total unsaturation present as 1,2- (or vinyl) was calculated according to the above equation using the 11.0 micron band and an extinction coefficient of 196 (liters-mols$^{-1}$-centimeters$^{-1}$).
The percent of the total unsaturation present as cis-1,4 was obtained by subtracting the trans-1,4- and 1,2- (vinyl) determined according to the above procedures from the theoretical unsaturation, assuming one double bond per each $C_4$ unit in the polymer.

EXAMPLE III

Butadiene was copolymerized with isoprene in the presence of a catalyst composed of triisobutylaluminum, cobaltous acetylacetonate, and water. The diluent was charged to the reactor first and the reactor was then purged with nitrogen. The monomers were then charged. Triisobutylaluminum was then charged followed by water and finally the cobaltous acetylacetonate was added. The polymer was recovered in the same manner as Example I and found to be very touch and tacky. The recipe and other results were as follows:

| | |
|---|---|
| 1,3-butadiene, parts by weight | 50 |
| Isoprene, parts by weight | 50 |
| Cyclohexane, parts by weight | 860 |
| Triisobutylaluminum, mhm. | 20 |
| Cobaltous acetylacetonate, mhm. | 0.8 |
| Water, mhm. | 24 |
| TBA:$H_2O$ mole ratio | 0.8:1 |
| Temperature, °F. | 122 |
| Time, hours | 4 |
| Total monomer converson, percent | 74 |
| Inherent viscosity [1] | 71 |

[1] U.S. Patent 3,078,254, column 10, lines 13–22.

These data show that copolymers can be prepared according to this invention.

EXAMPLE IV

Isoprene was polymerized in the presence of a catalyst composed of triisobutylaluminum, vanadium acetylacetonate [V(AA)$_3$], and water. Toluene was charged first and the reactor then purged with nitrogen after which the isoprene was introduced. Triisobutylaluminum was then added followed by the water and finally the vanadium acetylacetonate. The polymer was recovered as described in Example I and was tough and tacky. The recipe and other results were as follows:

| | |
|---|---|
| Isoprene, parts by weight | 100 |
| Toluene, parts by weight | 860 |
| Triisobutylaluminum, mhm | 30 |
| Vanadium acetylacetonate, mhm. | 2 |
| Water, mhm. | 30 |
| TBA:H$_2$O mole ratio | 1:1 |
| Temperature, ° F. | 158 |
| Time, hours | 16 |
| Conversion of isoprene, percent | 26 |
| Inherent viscosity (see footnote 1, Table I) | 1.66 |
| Gel, percent (see footnote 2, Table I) | 0 |
| Microstructure, wt. percent (see footnote 3, Table I)— | |
| Cis | 35 |
| 3,4-addition | 32.7 |

These data show that vanadium acetylacetonate can be used as a catalyst component.

EXAMPLE V

Isoprene was polymerized and the resulting polymer was then tested as an adhesive. In the polymerization, toluene was first charged to the reactor which was then purged with nitrogen and the isoprene then introduced. Triisobutylaluminum was then added followed by water and finally the cobaltous acetylacetonate was introduced. The recipe used and the results obtained were as follows:

| | |
|---|---|
| Isoprene, parts by weight | 100 |
| Toluene, parts by weight | — |
| Cyclohexane, parts by weight | 780 |
| Triisobutylaluminum, mhm. | 20 |
| Cobaltous acetylacetonate, mhm. | 1 |
| Water, mhm. | 24 |
| Temperature, ° F. | 158 |
| Time, hours | 6 |
| Conversion of isoprene, percent | 92 |
| ML-4 at 212° F. (ASTM D927-57T) | 68 |
| Inherent viscosity (see footnote 1, Table I) | 3.9 |
| Gel, wt. percent (see footnote 2, Table I) | 0 |
| Microstructure, percent (see footnote 3, Table I)— | |
| Cis | 31 |
| 3,4-addition | 52.0 |

The polymer was dissolved in toluene to make a solution of 10 to 15 weight percent concentration. The solution was applied to canvas strips and allowed to dry. Another coating of solution was then applied and the strips stuck together and allowed to dry in this condition. Similar strips were prepared using the butadiene/isoprene copolymer of Example III, natural rubber, a commercial cis-polyisoprene (72 ML-4 at 212° F.), cis-polybutadiene (40 ML-4 at 212° F., 95 weight percent cis), and polybutadiene prepared by polymerizing butadiene in the presence of n-butyllithium as the catalyst (42 ML-4 at 212° F.), all Mooney values being determined in accordance with ASTM D-1646-63.

The T-peel strength test procedure outlined in ASTM D-1876-61T was employed for each test specimen and the results were as follows:

| | Lbs./inch width |
|---|---|
| Polyisoprene from this Example V | 12.1 |
| Butadiene/isoprene copolymer from Example III | 15.6 |
| Natural rubber | 7.6 |
| Commercial cis-polyisoprene | 6.7 |
| Cis-polybutadiene | 1.5 |
| Polybutadiene (prepared with BuLi catalyst) | 0.6 |

These data show the superior adhesive strength of the polymers of this invention.

The polyisoprene described above was evaluated in both tread and carcass recipes. It exhibited higher hand tack than a 54 Mooney (ML-4 at 212° F.) commercial cis-polyisoprene and higher green tensile strength than natural rubber and the commercial cis-polyisoprene. It was also found to be less susceptible to reversion and the tread stock exhibited better retention of tensile strength and elongation during accelerated aging than the commercial cis-polyisoprene and natural rubber.

Reasonable variations and modifications are possible within the scope of this disclosure without departing from the spirit and scope thereof.

I claim:

1. A process for producing an essentially gel-free polymer containing at least 30 weight percent of 1,2- and/or 3,4-addition comprising contacting under polymerization conditions at least one conjugated diene containing from 4 to 12 carbon atoms per molecule, inclusive, and a catalyst formed on mixing (1) at least one organoaluminum compound represented by the formula R$_n$AlH$_m$ wherein R is selected from the group consisting of alkyl, cycloalkyl, and aryl radicals and combinations thereof containing from 1 to 20 carbon atoms, inclusive; $n$ is an integer from 1 to 3, $m$ is an integer from 0 to 2, and the sum of $n+m$ equals the valence of the aluminum; (2) at least one metal salt of a beta-diketone represented by the formula

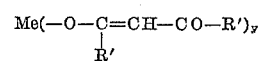

wherein Me is selected from the group consisting of cobalt and vanadium, R' is selected from the group coinsisting of alkyl, cycloalkyl, and aryl radicals and combinations thereof containing from 1 to 10 carbon atoms, inclusive, and $y$ is an integer equal to the valence of the metal Me; and (3) water, the mol ratio of organoaluminum compound to water being in the range of from about 0.5:1 to about 2:1, and the relationship of water to monomer being at least 5 gram millimoles of water per 100 grams of monomer, the molar ratio of the organoaluminum compound to the cobalt and/or vanadium salt being in the approximate range 2:1 to about 100:1 and wherein said contacting with said conjugated diene comprises the addition of the three component catalyst system prior to said polymerization and (b) recovering an essentially gel-free polymer containing at least 30 weight percent of 1,2- and/or 3,4-addition.

2. The method according to claim 1 wherein the polymerization is carried out at a temperature in the range of from about —40 to about 250° F. in the presence of a substantially inert diluent.

3. The method according to claim 1 wherein the conjugated diene is at least one of butadiene and isoprene and the metal salt of a beta-diketone is cobalt acetylacetonate.

4. The method according to claim 3 wherein the polymerization is carried out in the presence of a hydrogen diluent selected from paraffins, cycloparaffins, aromatic hydrocarbons, and mixtures thereof containing from 4 to 10 carbon atoms per molecule.

5. The catalyst which forms on mixing (1) at least one organoaluminum compound represented by the formula R$_n$AlH$_m$ wherein R is selected from the group consisting of alkyl, cycloalkyl and aryl radicals and combinations thereof containing from 1 to 20 carbon atoms, inclusive; $n$ is an integer from 1 to 3, $m$ is an integer from 0 to 2, and the sum of $n+m$ equals the valence of the aluminum; (2) at least one metal salt of a beta-diketone represented by the formula

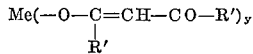

wherein Me is selected from the group consisting of cobalt and vanadium, R' is selected from the group consisting of alkyl, cycloalkyl, and aryl radicals and combinations thereof containing from 1 to 10 carbon atoms, inclusive; and $y$ is an integer equal to the valence of the metal Me; and (3) water; the mol ratio of organoaluminum compound to water being in the range of from about 0.5:1 to about 2:1.

6. The catalyst of claim 1 wherein the mixing is carried out at a temperature of from about −40 to about 250° F. in the presence of a substantially inert diluent.

7. The catalyst according to claim 5 wherein the organoaluminum compound is triisobutylaluminum and the metal salt of a beta-diketone is cobalt acetylacetonate.

8. A polymer produced according to claim 1 wherein said polymer comprises at least 30 weight percent of 1,2- and/or 3,4-addition and wherein said polymer is tough, tacky, rubbery, and wherein said polymer is essentially gel-free.

9. The polymers of claim 8 wherein said polymer possesses adhesive quantities measuring at least 12 lbs./in. width T-peel strength as outlined in ASTM D–1876–61T.

References Cited

UNITED STATES PATENTS

| 3,094,514 | 6/1963 | Tucker | 260—943 |
| 3,281,375 | 10/1966 | Vandenberg | 252—429 |
| 3,328,376 | 6/1967 | Bernemann et al. | 260—94.3 |

FOREIGN PATENTS

| 718,987 | 9/1965 | Canada. |
| 890,139 | 2/1962 | Great Britain. |

OTHER REFERENCES

Reich and Schindler, "Polymerization by Organometallic Compounds," Interscience Publishers (1966), pp. 671–672 relied on.

Gippin, vol. 6, No. 4, "Preprints," September 1961, p. A–40 relied on.

JOSEPH L. SCHOFER, Primary Examiner

R. A. GAITHER, Assistant Examiner

U.S. Cl. X.R.

252—431